Aug. 29, 1967

J. O. ECKSTINE 3,338,057

AUTOMATIC IRRIGATION GATE

Filed Jan. 8, 1965

Jack O. Eckstine
INVENTOR.

BY Clarence A. O'Brien
and Harvey B. Jackson
Attorneys

Aug. 29, 1967    J. O. ECKSTINE    3,338,057
AUTOMATIC IRRIGATION GATE
Filed Jan. 8, 1965    2 Sheets-Sheet 2

Jack O. Eckstine
INVENTOR.

BY *Clarence A. O'Brien*
*and Harvey B. Jackson*
Attorneys

United States Patent Office 3,338,057
Patented Aug. 29, 1967

3,338,057
AUTOMATIC IRRIGATION GATE
Jack O. Eckstine, Rte. 4, Box 49,
Longmont, Colo. 80501
Filed Jan. 8, 1965, Ser. No. 424,369
8 Claims. (Cl. 61—25)

ABSTRACT OF THE DISCLOSURE

A water flow regulating means for an irrigation ditch wherein a damming member is provided with an enlarged opening centrally therethrough. A gate panel is mounted for selectively closing and opening the water passing opening through the utilization of automatically releasable and engageable locking structure comprising a rod rotatably mounted transversely across the gate panel and having catch means on the opposite ends thereof which selectively lock with latch portions provided on the main damming member.

---

The present invention is generally concerned with irrigating, and is more particularly directed to a gate usable in conjunction with an irrigation ditch for selectively and automatically controlling the flow of water in the ditch.

It is the primary object of the instant invention to provide a gate which is automatically controlled so as to alternatively restrict the flow of water in an irrigation ditch and release the water at timed intervals without the necessity of manual attendance.

In addition, it is a significant object of the instant invention to provide a gate construction, which while relatively simple structurally, is so formed as to provide, upon a closing of the gate, an effective damming means for the irrigation ditch.

In conjunction with the above object it is also an object of the instant invention to provide a gate construction which incorporates laterally extending wing plates for engagement with the opposite banks of the irrigation ditch.

Further, it is an object of the invention to so construct the gate as to incorporate a safety spillway therein so as to eliminate any possibility of the dammed water overflowing the ditch bank.

Additionally, it is an object of the invention to incorporate a plurality of ground engaging anchoring means into the structure of the instant invention.

Basically, the structure of the instant invention consists of a central vertically orientated generally rectangular plate having an upwardly and outwardly inclined vertically orientated solid wing plate on each side thereof, the central generally rectangular section being positioned centrally within the irrigation ditch and transversely across the main flow path therethrough. The gate itself consists of a substantially circular panel pivotally engaged along the upper portion thereof for movement toward and away from the downstream end of a substantially cylindrical collar surrounding an enlarged opening through the central section. The gate panel, when engaged with the downstream end of the cylindrical collar, cuts off the flow of water through the damming structure and effects a build-up of water on the upstream side. The gate panel is maintained closed by a locking rod extending across the downstream face thereof and having laterally turned ends engaged behind catches or latches. This lock rod is periodically rotated, through a timer controlled solenoid mechanism, for effecting a release of the laterally turned ends thereof so as to enable a downstream pivoting of the gate panel under the force of the built-up water bearing thereagainst. The gate panel, upon being swung open under the force of the built-up water, automatically de-energizing the solenoid so as to allow for an automatic re-locking of the gate panel as it pivots to its lower position in engagement with the downstream end of the cylindrical collar subsequent to the passage of the previously stored water therethrough.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
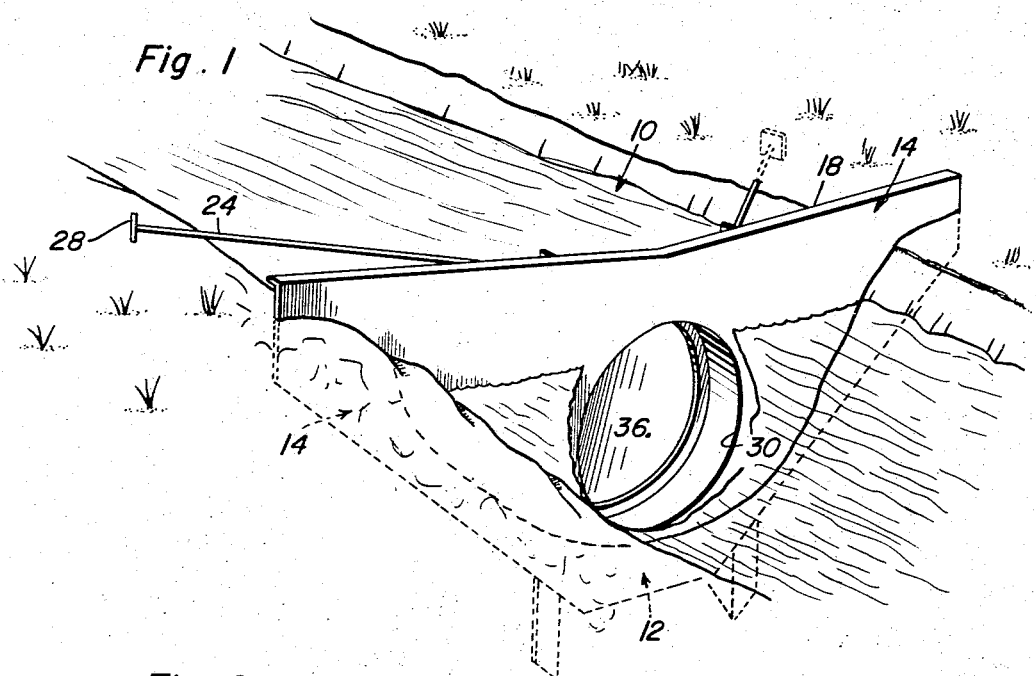
FIGURE 1 is a perspective view illustrating the gate construction of the invention in its operative position within an irrigation ditch.
Figure 2:
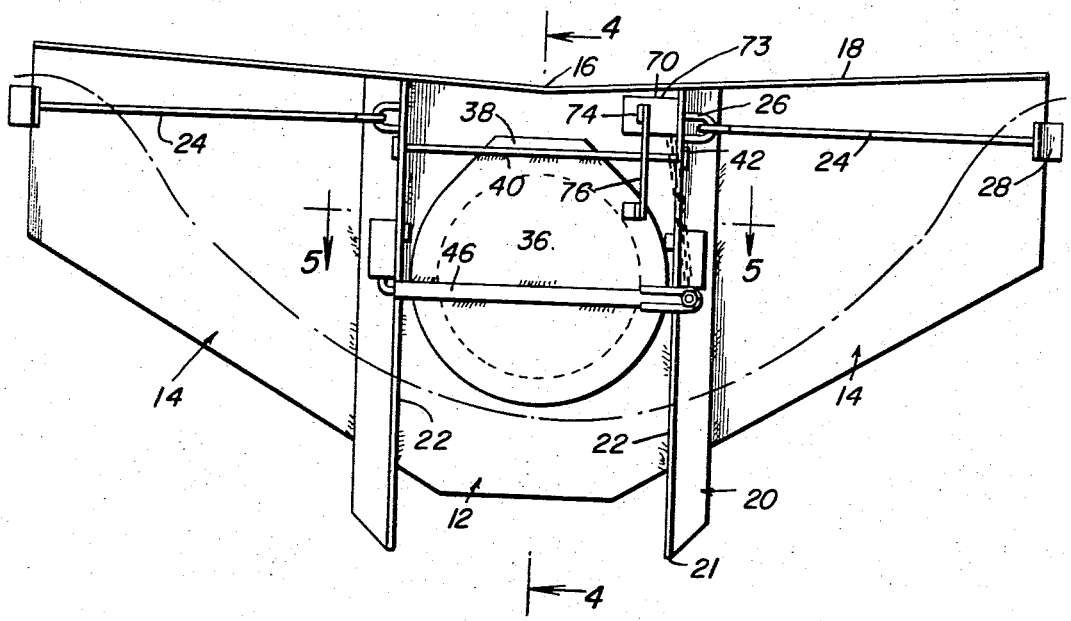
FIGURE 2 is an elevational view of the downstream side of the gate.

Referring now more specifically to the drawings, reference numeral 10 is used to generally designate the structure of the instant invention. This structure 10 includes a vertically orientated substantially rectangular central section 12 and two upwardly and outwardly inclined wing extensions 14, preferably formed of a single continuous metal plate possessing a substantial degree of rigidity so as to provide an effective dam construction when embedded within the ground as illustrated in FIGURES 1 and 2. The generally rectangular central portion 12 is of course orientated within the irrigation ditch itself and directly across the flow path therein, while the sides or wings 14 generally conform to the slopes of the side banks. Incidentally, it will of course be appreciated that whether or not the wing portions 14 are provided depends upon the specific shape of the irrigation ditch itself. Further, in order to prevent an overflowing of the banks upon a damming of the water, it will be noted that the upper edge of the unit 10 converges downwardly to a low point 16 at the center thereof corresponding with the center of the ditch itself, thereby providing in effect a spillway insuring a spilling of the water over the dam at this point, and as such eliminating any possibility of a build-up of water sufficient so as to overflow the banks of the ditch. With reference to the drawings, it will be noted that this upper edge, along the full length thereof, has a laterally projecting reinforcing flange 18.

In addition to the sections 12 and 14 actually being embedded within the ground, a pair of vertical angles 18 are welded to the downstream face of the structure along the opposite vetrical edges of the central section 12, these angle legs 20 projecting below the central section and terminating in pointed lower ends 21 which are driven into the ground when erecting the structure, thereby both rigidifying the structure and forming additional anchoring means. It will be noted that the angle members 20 have one leg thereof welded to the downstream face of the dam forming plate while the other legs project perpendicularly therefrom in parallel relation to each other, these projecting legs being indicated by reference numeral 22. Additional braces are provided in the form of elongated pipes or rods 24 pivotally connected, through enlarged U-bolts 26, to the upper end of the angle legs 22 and having enlarged anchoring feet 28 on the outer or free ends thereof, these anchoring feet of course being embedded within the bank of the ditch downstream of the gate containing dam itself.

The central portion 12 is provided with an enlarged circular opening 30 therethrough positioned directly within the flow path and having an upwardly inclined relatively short cylindrical collar 32 surrounding the opening 30 and projecting from the downstream side of the central section 12. This collar 32 includes a resilient sealing strip 34 fixed to and surrounding the downstream edge thereof so as to, in conjunction with the gate or gate panel 36 itself, provide an effective shield against the flow of water therethrough when the gate panel 36 is locked in its closed position as shall be explained presently.

The gate panel 36 consists of a circular piece of plate metal slightly larger than the inner end of the upwardly angled cylindrical collar 32 so as to overlap the edges thereof. This panel 36 also includes a truncated integral extension 38 projecting upwardly therefrom, this extension 38 having an elongated mounting bar or rod 46 welded transversely thereacross and projecting therebeyond for rotational reception through the downstream projecting legs 22 of the angle members 20, thereby pivotally or hingedly mounting the gate panel for movement between a first position in sealing engagement with the downstream end of the cylindrical collar 32 and a second open position upwardly and forwardly from the first position. Suitable means are of course provided for locking the ends of the mounting rod within the parallel legs 22 of the angle members 20 while retaining the rotational relationship therebetween, for example enlarged nuts 42 threaded on the opposite ends of the mounting rod 40.

In order to maintain the gate panel 36 closed so as to allow for the desired build-up of water on the upstream side of the structure 10, a rotatably mounted locking rod 44 is provided, this rod 44 being rotatably mounted within an elongated sleeve 46 welded diametrically across the downstream face of the gate panel 36. The rod 44 projects beyond both ends of the tube or pipe 46 and beyond the parallel legs 22, one end 48 of the rod 44 being laterally bent and terminating in a reversely curved tip 50. The opposite end of the locking rod 44 has an elongated rod 52 welded thereto and projecting laterally thereof parallel to the laterally bent end 48. The rod 52 projects laterally from the locking rod 44 in both an upstream direction and a downstream direction with the upstream portion of the rod 52 terminating in a reversely curved tip portion 54 corresponding to the curved tip 50, and with the downstream portion of the rod 52 being externally threaded throughout a major portion thereof.

Mounted on the outer side face of each of the legs 22 is a catch or latch 56. Each of these catches 56 is in the form of an angle member with one leg 58 of the angle member being positioned juxtaposed the leg 22. This leg 58 of the catch 56 is rotatably fixed, at its lower end as indicated by reference numeral 60, to the leg 22 for pivotal movement in a plane parallel to the plane of the leg 22 with this pivotal movement being limited by a threaded stud projecting through an elongated arcuate slot 62 adjacent the upper end of the leg 58 and having an enlarged wing nut 64 thereon. In this manner, it will be recognized that the rotational position of the catch member 56 can be varied as desired so as to insure a proper engagement of the reversely bent tips 50 and 54 behind the lower edge of the perpendicularly projecting second leg 66 of each of the catch angles 56, as will be best appreciated from FIGURE 3. The curvature of these tip portions 50 and 54 is to be such so as to allow for a camming action sufficient so as to produce a downward movement thereof as the gate panel 36 is closed under its own weight subsequent to the passage of the built-up water therethrough, these reversely curved portions 50 and 54 swinging upwardly once past the lower edges of the catch legs 66 through the greater weight of the threaded downstream end of the rod 52, this weight being increased by a pair of enlarged nuts 68 threaded thereon. The engagement of the catch 56 behind the legs 66 prevents a subsequent opening of the panel 36, thus enabling another build-up of the water on the upstream side of the structure 10.

The release of the gate panel 36 so as to allow an opening thereof under the force of the build-up of water is to be effected at predetermined intervals by a conventional electrical solenoid unit 70 which is to produce, through an elongated link chain 72, an upward pivoting of the outer end of the rod 52, this of course rotating the locking rod 44 and downwardly withdrawing the reversely bent tips 50 and 54 from engagement with the catch legs 66, thereby enabling the force of the water to open the gate panel 36. The activation of the solenoid unit 70 is to be controlled through a conventional timer unit 73. Further, it is also contemplated that a conventional microswitch 74 be incorporated into the circuit and operative, through an elongated link 76 pivotally mounted on the panel 36, by the upward swinging of the panel, for deenergizing the solenoid unit 70 and releasing the chain 72. In this manner, as soon as the force of the held-back water is no longer sufficient so as to sustain the weight of the panel 36, the gate panel 36 is free to swing closed and engage the reversely curved tips 50 and 54 behind the catch legs 66, thereby again preparing the structure 10 for the storage of water and the timed release thereof. Incidentally, it should be appreciated that a conventional mechanical timer and release can also be utilized if desired.

Figure 3:
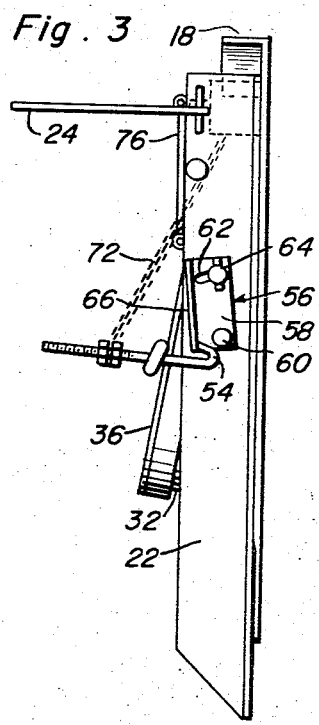
FIGURE 3 is a side elevational view of the gate construction.
Figure 4:
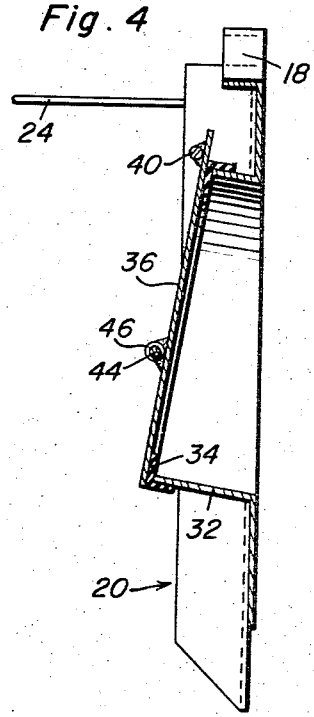
FIGURE 4 is a cross-sectional view taken substantially on a plane passing along line 4—4 in FIGURE 2.
Figure 5:
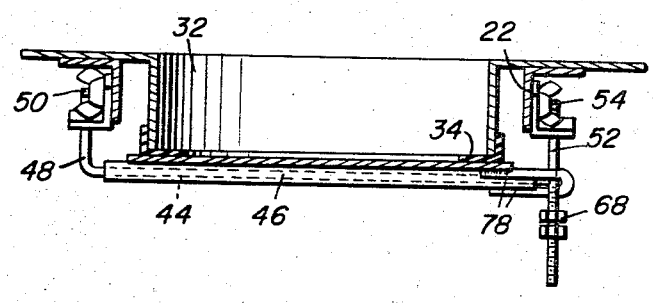
FIGURE 5 is a partial cross-sectional view taken substantially on the plane passing along line 5—5 in FIGURE 2.
Figure 6:
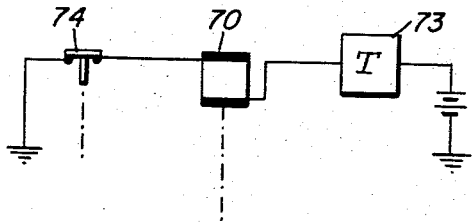
FIGURE 6 is a diagrammatic illustration of one form of automatic control means.

In order to properly orientate the reversely curved tips 50 and 54 for engagement with the catch legs 66, it will be noted that upper and lower offset bars 78 have been welded to the tube 46 so as to project longitudinally therebeyond over and under the rod 52, these bars 78 being integrally connected at the outer end thereof. The bars 78, while allowing for an upward pivoting of the threaded downstream end of the rod 52, limit the return movement of this rod 52, and consequently the laterally bent end 48 of the locking rod 44, to substantially a horizontal position, as illustrated in FIGURE 3. In this manner, the camming engagement of the reversely curved tips 50 and 54 with the catch 56 is insured. While chain 72 can be engaged with the outer end of the rod 52 in any suitable manner, it is preferred that this chain be received over the threaded end of the rod 52 and adjustably locked in position by the two aforementioned enlarged nuts 68, thereby providing a convenient means for effecting an adjustment of the length of the chain 72, as well as a variation in the weight distribution on the rod 52 so as to insure a return of this rod 52, and consequently, the laterally bent end 48, to the proper locking position subsequent to a release of the chain 72.

From the foregoing, it will be appreciated that a simple though highly novel means has been provided for effecting a sequential storage of water and a release thereof at predetermined intervals.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A water flow regulator for an irrigation ditch comprising a vertical enlarged water damming section positionable transversely across an irrigation ditch, an enlarged opening centrally through said section, a gate panel larger than said opening, means pivotally mounting said panel on the downstream side of the section for movement between a first position overlying and closing said opening, and a second position outward of said opening, lock means for fixing said panel in its first position, means for periodically releasing said lock means, said lock means including an elongated rod extending transversely across and beyond both sides of the gate panel, means rotatably mounting said rod on the downstream face of the gate panel, complementary catch means on the opposite ends of the rod and the enlarged section, said means for periodically releasing said lock means comprising means for periodically simultaneously disengaging the catch means at both ends of the rod through rotation of said rod, each catch means including a rod portion rigid with the elongated rod and projecting perpendicular therefrom toward the enlarged section, said rod portion having a reversely bent tip, and a latch means on said section, said tip, upon a rotation of the elongated rod, being selectively engageable and disengageable with the latch means.

2. The structure of claim 1 wherein one of said rod portions also projects perpendicularly away from said enlarged section, counterweight means on that portion of the one rod portion which projects away from the enlarged section for effecting a rotation of the elongated rod, and rod portions fixed thereto, and means for limiting this rotation under the influence of the counterweight means so as to position the reversely bent tips at a predetermined position for automatic engagement with the latch means upon movement of the gate panel to its first position, said reversely bent tips including camming surfaces thereon for effecting an automatic locking movement thereof in response to contact with the latch means.

3. The structure of claim 2 wherein said means for periodically releasing said lock means includes an elongated member secured to the counterweight end of the one rod portion and means for effecting a periodic pull on said member for producing a rotational movement of the reversely bent tips away from the latch means.

4. The structure of claim 2 wherein the means for limiting the rotation of the elongated rod under the influence of the counterweight means comprises a pair of bar-like members, one overlying and one underlying said one rod portion to the opposite sides of the elongated rod for engagement by said one rod portion thereagainst upon a rotation of the elongated rod under the influence of said counterweight means.

5. The structure of claim 3 including a centrally located spillway in the enlarged section.

6. The structure of claim 3 wherein said latch means is adjustably mounted on said section for an adjustment of the engagement and disengagement of the rod portion tips therewith, and means for adjusting the point at which said elongated member is secured to the counterweight end of the one rod portion.

7. A water flow regulator for an irrigation ditch comprising a vertical enlarged water damming section positionable transversely across an irrigation ditch, an opening centrally through said section, a gate panel, means pivotally mounting said panel on the downstream side of the section for movement between a first position overlying and closing said opening, and a second position outward of said opening, lock means for fixing said panel in its first position, said lock means including an elongated rod extending transversely across the gate panel and beyond one side thereof, means rotatably mounting said rod on the downstream face of the gate panel, complementary catch means on the projecting end of said rod and the enlarged section, and means for periodically disengaging the catch means through a rotation of said rod, said catch means including a member rigid with the elongated rod and projecting perpendicular therefrom toward the enlarged section, said member having a laterally directed tip, and a latch means on said section, said tip, upon a rotation of the elongated rod, being selectively engageable and disengageable with the latch means.

8. The structure of claim 7 wherein said member also projects perpendicularly away from said enlarged section, counterweight means on that portion of the member which projects away from the enlarged section for effecting a rotation of the elongated rod and member fixed thereto, and means for limiting this rotation under the influence of the counterweight means so as to position the laterally directed tip at a predetermined position for engagement with the latch means upon movement of the gate panel to its first position, said laterally directed tip including a camming surface thereon for effecting an automatic locking movement thereof in response to contact with the latch means.

References Cited

UNITED STATES PATENTS

| | | | |
|---|---|---|---|
| 1,176,390 | 3/1916 | Mercer | 61—25 |
| 2,584,364 | 2/1952 | Osborn | 61—25 |
| 2,654,225 | 10/1953 | Saunders et al. | 61—29 |
| 3,208,225 | 9/1965 | Humpherys | 61—25 |
| 3,217,497 | 11/1965 | Humpherys et al. | 61—25 |

EARL J. WITMER, *Primary Examiner.*